Figure 1:
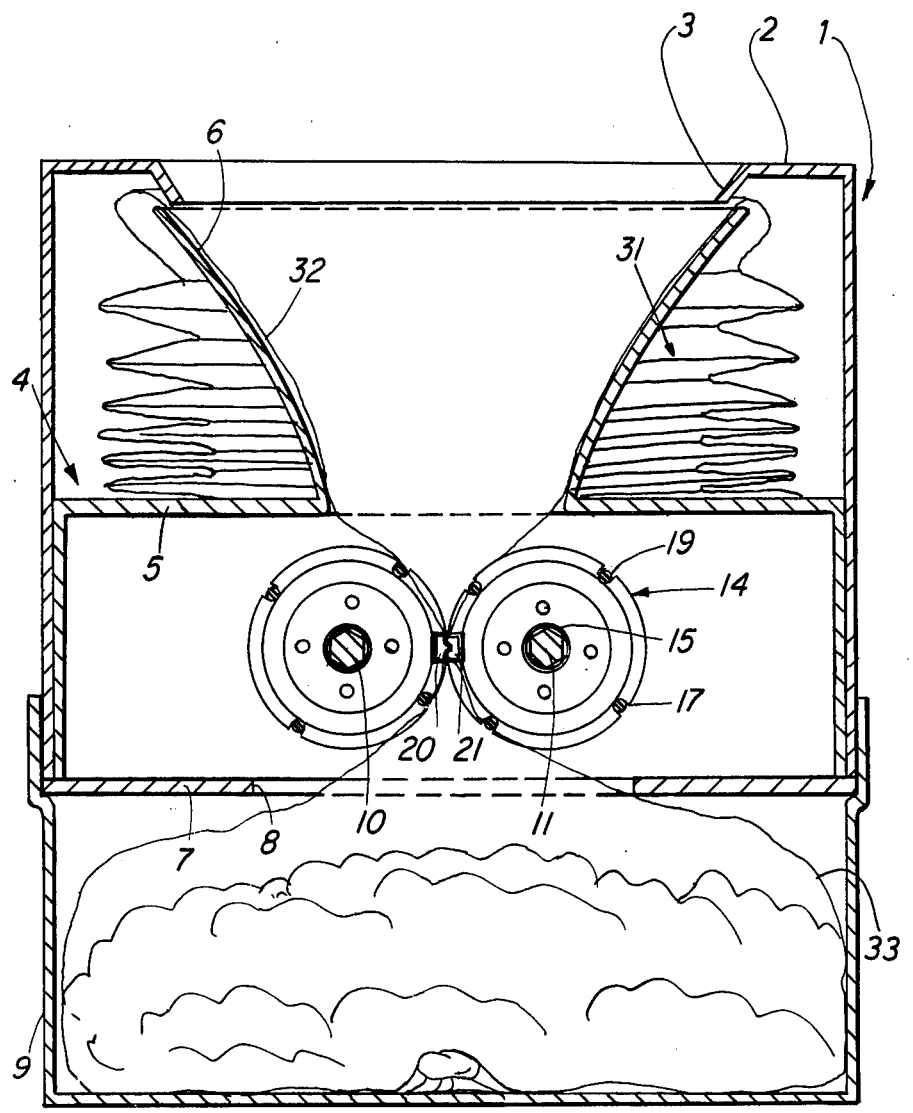

United States Patent [19]

Dahlen

[11] 4,025,969
[45] May 31, 1977

[54] SANITARY CLOSET

[75] Inventor: Gunnar John Dahlen, Partille, Sweden

[73] Assignee: Trailer Finans AB, Kristinehamn, Sweden

[22] Filed: Sept. 18, 1975

[21] Appl. No.: 614,673

[30] Foreign Application Priority Data

Sept. 20, 1974 Sweden .......................... 7411838

[52] U.S. Cl. ................................................. 4/142
[51] Int. Cl.² ...................................... A47K 11/02
[58] Field of Search ...................... 4/111, 114–117, 4/119, 134, 138, 139, 141, 142; 241/102, 46.11, 46.17

[56] References Cited

UNITED STATES PATENTS

| | | | |
|---|---|---|---|
| 2,671,906 | 3/1954 | Potts ........................................ | 4/142 |
| 3,665,522 | 5/1972 | Backlund et al. ...................... | 4/142 |
| 3,693,193 | 9/1972 | May ........................................ | 4/142 |

FOREIGN PATENTS OR APPLICATIONS 311,733    6/1969    Sweden .................................. 4/142

Primary Examiner—Richard E. Aegerter
Assistant Examiner—Stuart S. Levy

[57] ABSTRACT

The present invention relates to a sanitary closet of the kind in which a hose preferably made of plastic is fed downwards by a down-feeding mechanism. Two disc means are arranged for feeding down provided with closing elements arranged to close the hose temporarily by firmly compressing the hose, spaces positioned between said closing elements and arranged to permit the passage of portions of the hose inflated by the contents thereof and yieldable elements positioned in said spaces and adapted to compress the hose around the material therein permitting the material to pass and squeeze out any air entrapped in the hose.

1 Claim, 3 Drawing Figures

SANITARY CLOSET

The present invention relates to a sanitary closet having a closet bowl and below this a down feeding device for a hose perferably made of plastic, which is intended to travel down through the closet bowl through the down feeding mechanism and down into a collection space located below said mechanism, said down feeding device being constructed of two rotatably mounted disc means, between which the hose is intended to pass and to be fed down from the closet bowl to said collection space by mutual rotation of the disc means, of which each one is provided with at least one projecting element, which projecting element in a determined position of the disc means by pressing action are arranged to temporarily and intermittently seal the hose between said space and the closet bowl, while between said elements the disc means exhibit spaces arranged to permit the passage of portions of the hose, which are inflated by the contents of a substance.

In the prior art a type of closet is known, which is called sealing closets and which are characterized by the closet bowl being covered with a hose type plastic hose. After each use of the closet the plastic hose together with its contents is fed down by means of a mechanism. In this manner the plastic hose in the closet bowl thus constantly will be substituted by new clean plastic hose, while the plastic hose fed down is collected under the mechanism forming a tight container for the material fed down together with the hose. The mechanism takes care of the sealing of the hose, so that any odor cannot penetrate upwards from the low part thereof.

A downfeeding device for the hose mentioned is known from the Swedish patent specification No. 311 733. This downfeeding device comprises two rollers journalled on horizontal shafts exhibiting for one thing projecting portions and for another thing intermediate spaces, which are open in outwards direction. The rollers are arranged in cooperation with each other in at least one position of rotation by means of pressure exercised by the projecting portions to seal the hose and in connection with the rotating movement to feed the same in downwards direction, whereby material enclosed in the hose can pass the downfeeding device via the spaces of the rollers, which are open in outward direction.

From the point of view of construction the device is advantageous, the mechanism substantially only comprising the two synchronized rollers, and an operating means for their rotation. However, this known downfeeding device exhibits the drawback that the hose during the down feed tends to bulge the spaces mentioned, which are needed in order to permit the contents of the hose to pass the down feeding device. Thereby the bag-like container part of the hose will hold a lot of downfed air. This means that the space of the hose designed for collection is poorly utilized. To a certain extent the air enclosure can be reduced, if the hose is permitted in a stretched condition to hang down from the down feed mechanism, whereby the plastic material reduces its tendency to bulge in the space compartments of the rollers. However, this also brings in its train that the space of the hose designed for collection purpose has to be given a large dimension, it moreover not being possible to fully utilize it vertically in order to permit the stretching of the hose. Said conditions can be tolerated in connection with certain fixed installations, but in connection with movable installations one generally tries to arrive at a solution with limited height and the best possible utilization of the available space.

It is an object of the present invention to provide a downfeeding device of the kind mentioned by means of which compression of a plastic hose is made in such a manner that the enclosed material is permitted to pass the downfeeding device, while trapping and downfeeding of air for the most part is eliminated, while at the same time the hose is collected in a space at so low a height that any substantial stretching of the material does not take place.

The object of the present invention is accomplished by providing the disc means with resilient means urged against the hose with such a pressure that the hose substantially is compressed around any material contents present therein, any air trapped in the hose thereby being squeezed out, while the material contents of the hose cause the resilient means to yield during the passage of the hose.

Figure 2:
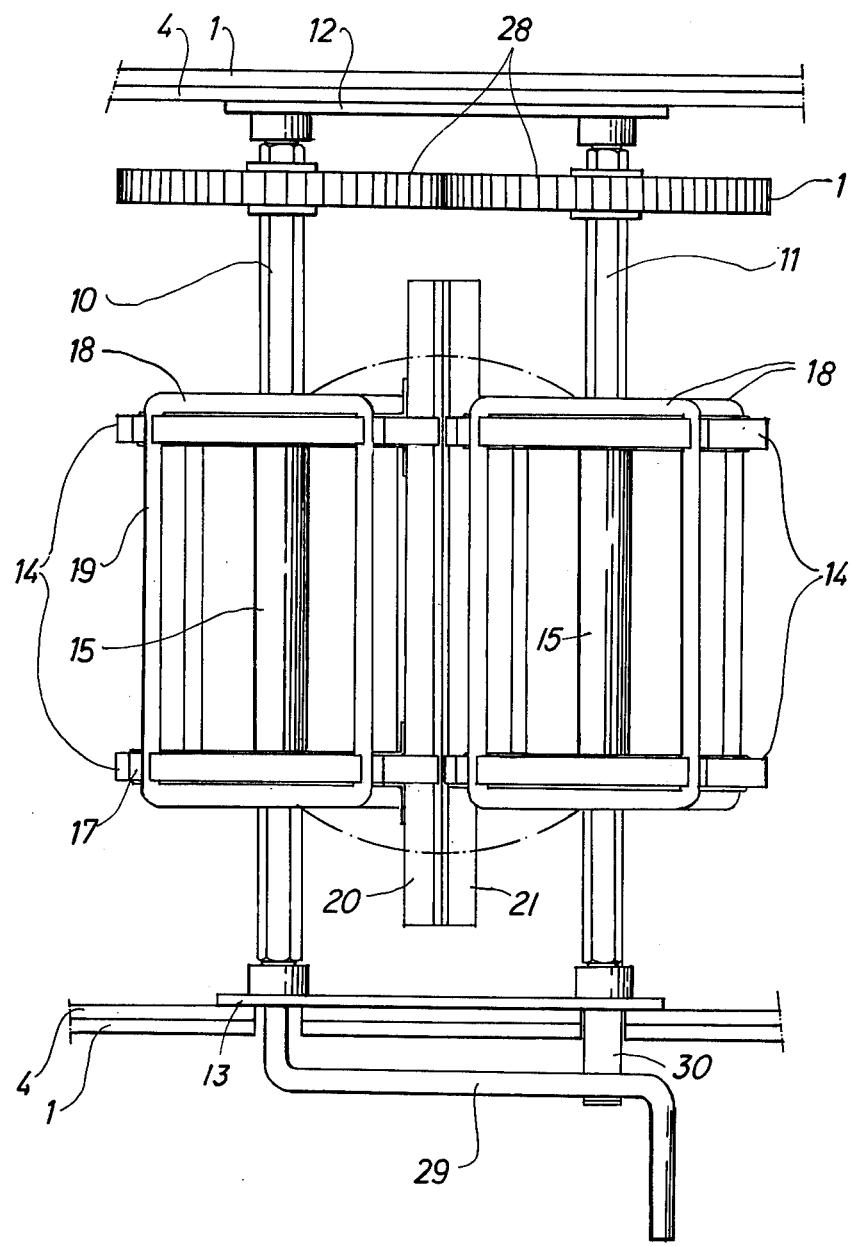
Figure 3:
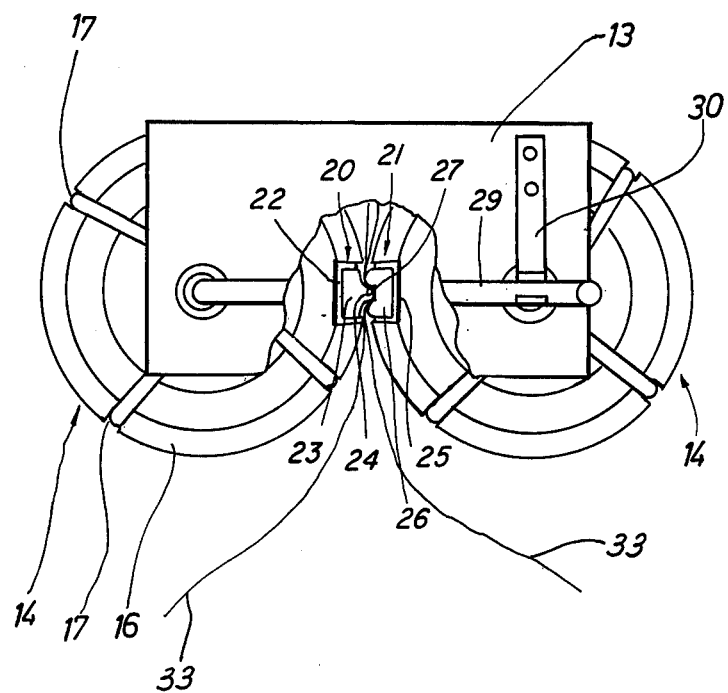

In the accompanying drawings an example of an embodiment of the invention is illustrated, FIG. 1 showing a vertical cross section of a closet, FIG. 2 showing a top view of the down feeding device of the closet of FIG. 1 on an enlarged scale, which device also is illustrated in FIG. 3, but in this figure in a partly broken side elevational view (seen from the underside in FIG. 2).

According to FIG. 1 the closet comprises a box-shaped top portion 1 with an annular seat 2, which with a short border surrounds an opening 3. The top portion 1 encloses an inner portion 4 with a bottom section 5 and a funnel shaped part forming the bowl 6 of the closet, the upper edge of which bowl follows the edge portion of the hole 3 at a short distance.

The top portion 1 and the bottom section 5 together rest on a bottom plate 7 with a hole 8. The bottom plate 7 in its turn rests on a receptacle 9, which constitutes the base of the closet.

Two shafts 10 and 11 extend through the common low section of the top portion 1 and the inner portion 4, said shafts being rotatably mounted in two plates 12 and 13 (see FIGS. 2 and 3) belonging to the mechanism. Two circular discs 14 are mounted on each one of the shafts on a non-rotatable mounting, spacer sleeves 15 extending between said discs. The edges of the discs 14 carry a lining 16 of resilient material (FIG. 3) with four notches 17. The notches 17 serve the purpose of holding the four endless loops 18 of rubber cord of a circular profile. The rubber cords at each pair of discs exhibit four portions 19, which extend between the discs and from yielding organs, which at the periphery of the discs extend parallel to the shafts 10 and 11.

Each one of the pair of discs 14 at their periphery supports a ledge 20 and 21. The ledge 20 of one of the pairs of discs comprises a U-shaped rigid profile 22 and an elastic profile 23, the latter one by way of example being made of rubber and provided with a projecting part 24, the profile 23 being kept in place in said U-shaped profile 22. The ledge 21 of the other pair of discs likewise comprises a rigid profile 25 and an elastic profile 26, which exhibits a groove 27 corresponding to the projection 24. As is evident from FIG. 2 the ledges 20, 21 project a certain distance outside of the outer periphery of respective discs 14.

Moreover, the two shafts 10 and 11 are connected to gears 28, by means of which the shafts 10, 11 are synchronized to rotate against each other over the same number of degrees. For the rotation the shaft 10 supports a crank 29, which by means of a spring snap 30 is arranged to be kept in place in the position of rotation illustrated in the figures with the ledges 20 and 21 engaging each other.

The hose that is going to be used in the closet is supplied in plied condition forming a cylindric ring 31 (see FIG. 1) which after separation of the top portion 1 from the inner portion 4 is placed on top of the latter one around the bowl of the closet. The hose is unfolded from the ring 31 and with a portion 32 brought down through the closet bowl 6 and further between the discs 14 and out through the hole 8 to the receptacle 9. Before being let down into the receptacle 9 the end of the hose is tied up, so that it will be tightly closed. After putting the top portion 1 in place again, the hose will pass in the slot between the edge portion of the hole 3 and the upper edge of the closet bowl 6.

The portion 32 of the hose tends to follow the walls of the closet bowl. The bottom opening of the closet bowl is so large relative to the distance between the discs 14 that its low edge (see dashed and dotted lines in FIG. 2) is outside of the discs 14. Thereby also the hose, the edge portions of which are pressed in between the discs 14 provided with the resilient lining 17, will project a distance outside of the discs, so that the hose is firmly kept in place by them. In the position of the down feeding device illustrated in the figures, i.e. the rest position, the hose is compressed between the two elastic members 23 and 26 attached to the ledge assemblies 20 and 21 and engaging each other said ledge assemblies extending beyond the outer periphery of said discs and said hose. By the compression odour is impeded from passing from the portion of the hose located in the receptacle 9, when the downfeed device is in the illustrated rest position.

By the ledges 20, 21 not only pressing against each other at their peripheral ends but, also interlocking each other as described a very secure seal is temporarily and intermittently obtained against odours for the plastic hose. By means of the arrangement of the discs 14 at a distance inside the outer edge portions of the hose a guarantee is obtained against the edge portions of the hose not getting inside the discs during the downfeed, so that they would loose their grip around the hose. The ledges 20, 21 projecting outside of the discs press the hose along its whole width and prevent any odour from escaping.

After the closet has been used, a section of the hose and the material collected above the compression point between the ledges 20 and 21 is fed down into the receptacle 9. In connection therewith the shaft 10 by means of the crank 29 is rotated in clockwise direction, whereby the shaft 11 actuated by the gear 28 is rotated the same number of degrees in counterclockwise direction. By the rotation of the shafts the discs 14 also rotate and bring with them the hose. At the same time the ledges 20 and 21 are displaced away from each other, so that the hose together with its contents can pass the downfeeding device. During the rotation the sections 19 of the rubber cords 18 in turn will approach the contact point between the discs 14 and thereby tend to compress the hose. This causes the air to be pressed out of the hose, while the more solid material is permitted to pass because the parts 19 yield, if they encounter any resistance. As is evident especially from FIG. 1, the parts 19 do not exhibit the same angular position at the two pairs of discs, and therefore they will cooperate in a zigzag manner. When the crank 29 and consequently the discs 14 have been rotated one turn, the ledges 20 and 21 are again right in front of each other in the compression position, and a downfeed cycle is completed.

According to the downfeed of the hose, the latter is unfolded from the ring 31, and new clean material will at all time be available in the closet bowl 6. Little by little the low part of the hose forms a bag 33 in the receptacle 9. The bag 33 is filled with substantially only solid and liquid material without air enclosures. When the receptacle 9 is emptied, the upper end of the hose is torn off and tied up, whereafter it is fed down through the downfeeding device. After emptying the receptacle 9 the previously described cycle of insertion of the hose is repeated.

Within the scope of the following claims certain modifications of the invention in variation of the embodiment described are possible. Thus, the yielding compression means which have been described in the form of rubber cords, can be substituted by other types of yielding means. Thus, special springs can be introduced instead of the rubber cords. Also brush-like ledges or such ones with projecting flexible fingers can be used. In the description the discs 14 have been indicated as having a soft edge or by way of example rubber in order to provide the necessary secure grip around the hose. However, such a grip can just as well be provided by a springing mounting of the shafts of the discs or by said shafts in themselves being made springing. The same goes for the compression ledges, which were indicated to be made of elastic material. It is obvious that depending upon the chosen size of the discs and the desired distance of downfeed for the hose the discs can be provided with several compressing ledges and a greater number of springing organs than what has been indicated above. The operating mechanism with its crank has been chosen as an example only and can by way of example be substituted by a motor driven device.

I claim:

1. A sanitary closet having a bowl and therebelow a device for directing a substantially continuous hose of resilient material through the bowl and said device and further downwardly into a collecting section locating below said device, the device comprising two rotatably mounted roller means arranged for so directing said hose by mutual rotation of the roller means with the hose extending therebetween, at least one of said roller means being provided with closing elements arranged to close the hose temporarily and intermittently in a position of the roller means between said collecting section and said bowl by firmly compressing the hose, spaces defined by said closing elements and arranged to permit the passage of portions of the hose inflated by the contents thereof, resilient means positioned in said spaces comprising endless resilient stretchable loops, which are connected to the roller means and extend within said spaces and adapted to compress the hose around the material therein contained to squeeze out any air entrapped in the hose and direct the same to the upper part of the hose while permitting the said material to pass within the hose between the roller means.

* * * * *